United States Patent [19]

Prymelski

[11] 4,150,185

[45] Apr. 17, 1979

[54] BUILDING MATERIALS IN THE FORM OF WOODSTONE PANELS OR SHEETS AND PROCESSES FOR THEIR PRODUCTION

[75] Inventor: Franz Prymelski, Hamburg, Fed. Rep. of Germany

[73] Assignee: Joachim zur Verth, Hamburg, Fed. Rep. of Germany

[21] Appl. No.: 787,952

[22] Filed: Apr. 15, 1977

Related U.S. Application Data

[63] Continuation of Ser. No. 626,764, Oct. 29, 1975, abandoned.

[30] Foreign Application Priority Data

Nov. 5, 1974 [DE] Fed. Rep. of Germany ....... 2452378

[51] Int. Cl.$^2$ .......................... B32B 5/12; D04H 1/16; B32B 23/00
[52] U.S. Cl. .................................... 428/113; 264/122; 428/114; 428/326; 428/330; 428/331; 428/338; 428/921
[58] Field of Search ............... 428/113, 122, 114, 212, 428/321, 326, 330, 331, 338, 532, 537, 921; 264/113, 122; 106/107, 108

[56] References Cited

U.S. PATENT DOCUMENTS

| | | | |
|---|---|---|---|
| 3,309,444 | 3/1967 | Schueler | 264/122 |
| 3,391,233 | 7/1968 | Polovtseff | 264/113 |
| 3,778,304 | 12/1973 | Thompson | 106/107 |
| 3,788,870 | 1/1974 | Verth et al. | 106/108 |

*Primary Examiner*—William R. Dixon, Jr.
*Attorney, Agent, or Firm*—Michael J. Striker

[57] ABSTRACT

Processes for the production of a building material in the form of woodstone panels or sheets which comprises preparing a mixture consisting essentially of between 30 and 40 parts by weight of finely divided calcined magnesite, a wood filler consisting predominantly of wood chips in an amount that is between 3 and 4 times, or between 1.05 and 1.8 times, the weight of the calcined magnesite, between 2 and 8, and preferably between 4 and 6, parts by weight of inactive diatomaceous earth, between 9 and 12 parts by weight of magnesium chloride in the form of an aqueous solution, and sufficient additional water to bring the water content of the mixture to between 30 and 60 parts by weight, compressing the said mixture into a desired shape by subjecting it to a pressure between 15 and 50 bars and hardening the said compressd mixture within a period of 20 minutes at a temperature between 120° and 220° C., and building materials produced by the said processes.

11 Claims, No Drawings

BUILDING MATERIALS IN THE FORM OF WOODSTONE PANELS OR SHEETS AND PROCESSES FOR THEIR PRODUCTION

This is a continuation, of application Ser. No. 626,764, filed Oct. 29, 1975 now abandoned.

BACKGROUND OF THE INVENTION

The present invention pertains to building materials in the form of panels or strands which are referred to herein as woodstone panels or strands and which have excellent dimensional stability that are produced by compression and hardening by heat of a mixture of a wood filler consisting predominantly of wood chips, inactive diatomaceous earth, finely divided calcined magnesite, and an aqueous solution of magnesium chloride, as well as processes for their production.

Although petrified wood is also referred to as woodstone, it is to be understood that woodstone, as the term is used herein, refers only to building materials such as are specifically described herein.

The term chipboard that is used herein, which is generally referred to as a paperboard made from waste paper, is used herein to refer to panels or boards made from sawdust or wood chips that have been bound together with binders consisting of conventional synthetic resins, which the woodstone building materials of the present invention closely resemble.

Although wood chips and sawdust are referred to herein as wood fillers, they actually are the principal components that are bound together with a binder to produce the woodstone and are to be understood as such. Sawdust, when referred to herein, refers only to the dust or particles produced in sawing wood.

Many processes for the production of woodstone building materials, which are also known as xylolith and xylolite boards or sheets, are known. In such prior processes, finely divided calcined magnesite, which is a so-called light or very bulky form of magnesium oxide or magnesia, in contradistinction to so-called heavy magnesium oxide or the dense form of magnesium oxide, is mixed together with twice or three times its volume of wood filler and an aqueous solution of magnesium chloride and the mixture thus prepared is molded into a desired shape and compressed in a compression-molding press. Woodstone panels produced in this manner, however, require very long periods for hardening or setting and do not have adequate dimensional stability.

In order to overcome these disadvantages, various alternative processes have been proposed, which however have not achieved any marked commercial success.

A process for the production of woodstone panels is also described in German Pat. No. 808,570, in which a mixture of calcined magnesite and fillers in a ratio by weight between 3:1 and 4:1, respectively, is mixed with as little mixing liquid as is necessary to produce a mixture that before compression is a powdery mass that does not cohere and which, upon compression, releases no or only a small amount of the mixing liquid. The mixture thus prepared is then compressed under a pressure between 20 and 40 kilograms per square centimeter and heated to the boiling point of the mixing liquid. The mixing liquid that is used is a highly concentrated aqueous solution of magnesium chloride (density 1.26 to 1.34 grams per liter, which is equivalent to more than 30° Baume) or magnesium sulfate (density 1.20 to 1.26 grams per liter) or both. This process is however very expensive and yields only woodstone panels of high density which are neither self-supporting nor capable of retaining screws.

In U.S Pat. No. 1,443,097, a process is described for the production of a building material from a mixture consisting of sawdust, magnesium oxide and an aqueous solution of magnesium chloride. In this process the sawdust is saturated with a solution of magnesium chloride having a specific gravity from 1.16 to 1.26 at 15° C., which is equivalent to a solution containing 18 to 29% by weight of $MgCl_2$. The excess solution is then squeezed from the sawdust saturated therewith and magnesium oxide in an amount equal to the weight of magnesium chloride therein, or up to 5 times that amount is then mixed therewith. The mixture is then molded into the desired shape and allowed to set without compression or heating. The product is said to consist of about 90% by volume of wood filler corresponding to a weight ratio magnesium oxide to wood filler of about 1:2.4. Building boards of this type, however, are neither self-supporting nor dimensionally stable nor incombustible and fire-retardant.

In U.S. Pat. No. 3,788,870 are disclosed xylolith building boards and sheets made by shaping and hardening without pressure a mixture of calcined magnesite, wood filler, and an aqueous magnesium chloride solution having a specific gravity of 10° to 15° Baume which is equivalent to a solution containing between approximately 8.5 and 13.3% by weight of $MgCl_2$. The hardened mixture has a ratio of magnesium oxide to wood filler between 1:1 to 1:1.5 and a ratio of magnesium oxide to magnesium chloride between 2:1 and 4:1 and may also contain inactive diatomaceous earth.

Such building boards and sheets can be made by mixing together into a plastic mass one volume of a finely divided mixture of calcined natural and synthetic magnesite with from 2 to 2.7 volumes of a magnesium chloride solution having the specific gravity specified hereinbefore, and between 4.5 to 6.2 volumes of wood filler. This mixture is allowed to swell for 45 and 90 minutes, then shaped in an open mold, dried without compression for 4 hours at a temperature between 30° and 40° C. and then removed from the mold and allowed to dry for a further period of at least 24 hours at a temperature between 50° and 60° C. Although the woodstone panel thus produced is self-supporting and incombustible and has improved dimensional stability there are still certain improvements of the mechanical properties desirable and the process due to the relatively long hardening was found to be unsuitable for commercial production.

SUMMARY OF THE INVENTION

The principal object of the present invention is to provide a building material in the form of woodstone panels or sheets of the specified kind which resemble in appearance conventional chipboard panels but which are distinguished therefrom by proving incombustible and fire retardant in the internationally adopted fire tests specified in chapter II, part D (fire protection), regulation 35 of the Final Act of the International Conference on Safety of Life at Sea (SOLAS), 1960, as well as processes for their production which greatly reduce the hardening period and enable a rapid continuous production. Other objects and advantages of the invention, some of which are referred to hereinafter, will be apparent to those skilled in the art to which the invention pertains.

In accordance with the present invention, the mixtures that are required to achieve the foregoing objects comprise a finely divided light calcined magnesite, a wood filler consisting predominantly of wood chips, inactive diatomaceous earth, and an aqueous solution of magnesium chloride. The ratio of the various components to each other by weight must be as follows:

(a) A ratio of magnesium oxide to the wood filler between 1:3 and 1:4, respectively, and preferably between 10:32 and 10:35, respectively, (b) a ratio of magnesium oxide to magnesium chloride between 3:1 and 4:1, respectively, and preferably between 16:5 and 18:5, respectively, (c) a ratio of magnesium chloride to wood filler between 1:9 and 1:12, respectively, (d) inactive diatomaceous earth in an amount between 2 and 15%, and preferably between 4 and 12%, by weight of the wood filler.

The mixture may also optionally include one or more of the following constituents, each in percentages by weight of the wood filler:

(1) A concentrated aqueous alkali-metal silicate solution such as is known as water glass or soluble glass, up to 5%, and preferably between 2 and 4%, (2) talc, up to 3% and preferably between 0.5 and 1%, (3) a pulverized rock filler, up to 10% and preferably between 0.2 and 3%, and (4) magnesium sulfate, up to 15% and preferably between 2 and 12%.

The wood filler should consist predominantly of wood chips, the individual chips or particles of which have a length of 20 millimeters at most.

In one embodiment of the invention, the building material may be in the form of an extruded panel or sheet in which the particles of the wood filler are oriented in a direction that is essentially parallel to a plane which is normal to the direction of the extrusion and also normal to the plane of the major surfaces of the panel or strand.

In another embodiment of the invention the building material may be in the form of a compressed panel or sheet in which the particles of the wood filler are oriented in a direction that is essentially parallel to the plane of the major surfaces of the panel or strand.

In accordance with the processes of the present invention, the mixing together of the various components of the mixture and compression and hardening of the mixture can be effected in the following manner:

Between 30 and 40, and preferably between 32 and 36, parts by weight of finely divided light calcined magnesite is mixed with wood chips in an amount between 3 and 4 times, or between 1.05 and 1.8 times, by weight of the calcined magnesite, between 2 and 8, and preferably between 4 and 6, parts by weight of inactive diatomaceous earth, an amount of at least one aqueous solution containing in total between 9 and 12 parts by weight of magnesium chloride and in total between 30 and 80, and preferably 40 to 60, parts by weight of water. The mixture is thoroughly mixed, then formed or molded into a desired shape and hardened for a period between 3 and 20, and preferably 8 to 15, minutes at a temperature between 120° and 220° C., and preferably between 160° and 190° C., at a pressure between 15 and 50 bars.

In carrying out the processes of the present invention, up to 5%, and preferably between 2 and 4%, by weight of a concentrated solution of an alkali-metal silicate, or up to 3%, and preferably between 0.5 and 1%, by weight of talc, or up to 10%, and preferably between 0.2 and 3%, by weight of a pulverized rock filler, or up to 15%, and preferably between 2 and 12%, by weight of magnesium sulfate, or one or more of these substances, may advantageously be added to the mixture.

In preparing a mixture that is suitable for extrusion in accordance with the processes of the present invention, the wood filler can be mixed with a liquid mixture or slurry of the other required components. In order, however, to avoid any undesired premature reaction between the magnesium chloride or the alkali-metal silicate, the wood filler can be mixed with an aqueous mixture containing the calcined magnesite, the inactive diatomaceous earth and the alkali-metal silicate, and a separately added concentrated aqueous solution containing the magnesium chloride. The mixing can advantageously be performed by spraying the wood filler while mixing same with an aqueous slurry of the calcined magnesite, inactive diatomaceous earth and alkali-metal silicate and simultaneously or at a separate time with concentrated aqueous solution of magnesium chloride containing between 28 and 42 grams per liter of magnesium chloride.

For performing the extrusion economically in a commercial operation, the prepared mixture is continuously introduced by a plunger into the heated channel of an extruder at such a rate that the mixture passing through the channel at a speed between 0.1 and 1, and preferably between 0.2 and 0.6, meter per minute is hardened within said channel and the hardened strand thus extruded is then cut into a desired length. In order to provide safe trouble-free operation of such a process, the wood chips that are used should be dried to a moisture content below 5%, and preferably between 2 and 4%, by weight and the mixture before being charged in the extruder should be stored or set aside for a period between 10 and 60, and preferably between 20 and 30, minutes. The water content of the prepared mixture should also be reduced to a maximum of 16%, and preferably between 7 and 10%, by weight.

In accordance with another method for performing an alternative process of the present invention, the prepared mixture can also be hardened to a panel in a mold in a compression molding press. A mold that is suitable for this purpose consists of flat metal sheets with raised edges on all sides which can, dependent upon the size of the available press, have a length of up to approximately 5 meters and a width of up to approximately 4 meters. For performing the process of the present invention in a compression molding press, the wood filler can be mixed dry with the calcined magnesite, the inactive diatomaceous earth, and the other solid ingredients, and the dry mixture can then be mixed further with the aqueous solution of magnesium chloride.

In accordance with such compression-molding-press processes, both single layer and multilayer panels having external surface layers and at least one internal layer may be produced. Conventional apparatus and methods that are used for the production of chipboards can be used for inserting the mixture into the compression molding press molds. Before the mixture is placed into the mold, its moisture content should be adjusted to between 20 and 30%. After equalization of the thickness of the layers, the layers should then be subjected in a suitable preliminary press to a preliminary compression and then to a further compression in a main press which can serve as a multilayer press, in which the mixture, depending upon its composition and the size of the panels, is hardened within a period between 5 and 20 minutes at a preferred temperature range between 150° and 200° C. and a preferred pressure range between 20 and 40 bars. Subsequently the panel-shaped building material thus produced is removed from the press and, if necessary, is subjected to a finishing operation by polishing or abrading, as is customary in making conventional chipboard panels.

In accordance with another embodiment of the processes of the present invention, for effecting the compression and hardening of the prepared mixture in a compression molding press in a continuous manner, two endless belts are provided which are spaced apart from each other so that a channel is formed into which the prepared mixture is continuously charged. During its passage through this channel between the belts the mixture is subjected to compression and heat sufficient to harden it and the continuous strand of material passing therethrough is then removed from the belts at the discharge end of the channel.

Although the building materials in the form of panels or strands that are formed in accordance with the processes of the present invention resemble in appearance conventional chipboards made from wood chips that had been bound together with binders consisting of synthetic resins, they are incombustible and are fire resistant. They can be produced simply and in a continuous manner as described herein and only a very short period which is less than 15 minutes is required for their setting or hardening. Panels of the said building material are dimensionally stable and have a high tensile strength and, like wood, can be sawed and will retain nails and screws. It was most surprising that these building panels containing up to 70% by weight of wood chips, do not burn or ignite when exposed for 30 minutes to a flame having a temperature up to 843° C., the temperature rise on the unexposed side of the panel being less than 100° C., and even after such exposure to the flame still have sufficient mechanical strength.

DETAILED DESCRIPTION AND PREFERRED EMBODIMENTS OF THE INVENTION

The invention is further described in connection with the following example which was selected solely for purposes of illustration and consequently is not to be construed as restrictive of the invention or its scope.

EXAMPLE

This Example pertains to a process in accordance with the present invention for the continuous production of a woodstone panel by extrusion.

A clear solution of magnesium chloride was prepared by dissolving 100 kilograms of magnesium chloride hexahydrate containing approximately 50% by weight of $MgCl_2$ in 20 kilograms of water that has been warmed to 65° C. and stirred continuously. To this solution was then added 1 kilogram of powdered quartz and 4 kilograms of finely powdered talc which were thoroughly dispersed therein.

Another mixture was prepared by continuously stirring together 100 kilograms of calcined natural magnesite having a bulk density of 0.9, which is also known as light magnesia, 100 kilograms of water, 15 kilograms of calcined inactive diatomaceous earth of the same fine quality that is used in producing rubber tires, which is also known as kieselguhr, and 8 kilograms of an aqueous solution of sodium silicate having a specific gravity of 37.5° Baume, such as is available from BASF Corporation as BASF 37/39 sodium silicate. ($SiO_2:Na_2O = 3.35$)

Dried wood chips having a moisture content of 4% by weight and a maximum length of 18 millimeters were charged into a rotary-drum-type mixer at the rate of 16 kilograms per minute. Into this rotary mixer were also sprayed onto wood chips therein by means of centrifugal distributors a stream of the foregoing aqueous magnesium chloride solution containing quartz and talc suspended therein at the rate of 4 kilograms per minute, and a stream of the foregoing mixture of magnesia, inactive diatomaceous earth and sodium silicate at the rate of 12 kilograms per minute. The mixture that was discharged continuously from the rotary-drum mixer had a water content between 40 and 44% by weight, which was reduced to about 16% by allowing the mixture to stand for between 20 and 30 minutes in an intermediate bunker or bin, after which it was conveyed to a rotary-drum dryer where it was further dehydrated until it had a water content of only 10%. The thus-dried mixture was then conveyed to an extrusion press constructed of sheet steel, the channel of which had a length of 220 meters, a width of 1250 millimeters, and a height of 19 millimeters, which was heated by superheated steam to a temperature of 180° C.

The mixture passing through the extrusion press was compressed in the channel by a plunger which pushed it through the channel at a speed of 50 centimeters per minute to form an endless strand having a width of 1250 millimeters and a thickness of 19 millimeters. The strand extruded from the extruder was cut directly after discharge from the extruder into panels having a length of 2500 millimeters.

The thus extruded panels had a smooth surface and a gross density of 784 kilograms per cubic meter, a bending strength of 160 kilograms per square centimeter, and a transverse tensile strength of more than 100 kilograms per square centimeter. The panels that were thus produced were furthermore dimensionally stable, exhibited no deformation or bloom, and also, even after long soaking in water, did not show any evidence of swelling. They were also found to be noninflammable and fire resistant and complied with pertinent technical standards and tests with respect to these properties.

For the continuous production of the building materials of the present invention by means of a compression-molding-press operation, the predried wood chips are intimately mixed together in a power mixer with the calcined magnesite, the inactive diatomaceous earth, and the remaining solid components for a period from about 10 to 15 minutes and the resulting dry mixture is then sprayed with the aqueous solution of magnesium chloride while the mixing is continued. The thus prepared mixture is then distributed by conventional mechanical means into open sheet metal compression molds moved on a conveyor belt and corresponding to those conventionally used for the production of chipboards with synthetic resin binders. In this manner, single layer panels as well as multilayer panels containing external surface layers and at least one intermediate layer can be produced as desired by distributing in conventional manner the superposed layers of the various mixtures upon each other. After assembling the various layers the mixture is preliminarily compressed in a preliminary press and then is compressed and hardened in a main press which can serve as a multilayer press for receiving and simultaneously compressing as many as 20 molds.

The compression-molding-press operation can be carried out in conventional plants for the production of chipboards with synthetic resin binders, the only changes or adjustments that are necessary being the preparation of the mixture that is to be molded and the conveying of the mixture to the mold. Since the operation of plants for the production of chipboard panels with synthetic resin binders and their associated equipment such as molds, multistage presses, measuring, filling and levelling devices, as well as associated conveying equipment, are known to persons skilled in the art to which this invention pertains, and such plants can be used for carrying out the processes of the present invention without fundamental technical readjustments, a more detailed description accordingly appears not to be required, since the essentials of the processes of the present invention reside not in the construction of the apparatus or equipment that is required for this purpose but in the herein disclosed criteria and in order to carry out these processes any suitable equipment can be used which is capable of providing the parameters specified herein.

The processes of the present invention which were disclosed hereinbefore and were illustrated by the foregoing detailed Example can be varied in various manners as will be understood by those skilled in the art to which this invention pertains in order to meet desired requirements with such facilities as are available, by adjusting the proportion of the constituents within the specified ranges in consideration of the purpose for which the building material is to be used and the characteristics of the materials that are to be used to produce the same.

It is also often desirable to provide at least one surface of the building material panel with a coating, either to improve its appearance or improve its stability to weathering and chemical attack, or both, the said coating advantageously being formed of an incombustible material.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A woodstone building material in the form of a panel or sheet which is formed from a mixture hardened under pressure, said mixture consisting essentially of finely divided calcined magnesite, a woodfiller consisting predominantly of wood chips, inactive diatomaceous earth, and an aqueous magnesium chloride solution,
    (a) the ratio by weight of magnesium oxide to woodfiller in said mixture being between 1:3 and 1:4, respectively,
    (b) the ratio by weight of magnesium oxide to $MgCl_2$ in said mixture being between 3:1 and 4:1, respectively,
    (c) the ratio by weight of $MgCl_2$ to woodfiller in said mixture being between 1:9 and 1:12, respectively,
    (d) the content of inactive diatomaceous earth in said mixture being between 2 and 15% by weight of the woodfiller, and said material having the appearance of resin-bonded chipboard material, while being non-combustible and flame retardant.

2. The building material of claim 1 in which the mixture additionally included a concentrated aqueous solution of an alkali-metal silicate in an amount up to 5%, by weight of the wood filler.

3. The building material of claim 1 in which the mixture additionally included talc in an amount up to 3%, by weight of the wood filler.

4. The building material of claim 1 in which the mixture additionally included a pulverized rock filler in an amount up to 10%, by weight of the wood filler.

5. The building material of claim 1 in which the mixture that was compressed and hardened included magnesium sulfate in an amount up to 15%, by weight of the wood filler.

6. The building material of claim 1 in which the individual particles of the wood filler that were included in the compressed and hardened mixture had a length of 20 millimeters at most.

7. The building material of claim 1 in the form of a die-extruded panel or sheet in which panel or sheet the particles of the wood filler are oriented in a direction that is essentially parallel to a plane which is normal to the direction of the extrusion and also normal to the plane of the major surfaces of the panel or sheet.

8. The building material of claim 1 in the form of a compressed panel or sheet in which the particles of the wood filler are oriented in a direction that is essentially parallel to the plane of the major surfaces of the panel or sheet.

9. The building material of claim 1 at least one surface of which has a water-resistant coating.

10. A process for making a woodstone building material in the form of a panel or strand comprising preparing a mixture consisting essentially of finely divided calcined magnesite, a woodfiller consisting predominantly of wood chips, inactive diatomaceous earth, and an aqueous magnesium chloride solution,
    (a) the ratio by weight of magnesium oxide to woodfiller in said mixture being between 1:3 and 1:4, respectively,
    (b) the ratio by weight of magnesium oxide to $MgCl_2$ in said mixture being between 3:1 and 4:1, respectively,
    (c) the ratio by weight of $MgCl_2$ to woodfiller in said mixture being between 1:9 and 1:12, respectively,
    (d) the content of inactive diatomaceous earth in said mixture being between 2 and 15% by weight of the woodfiller, and hardening the mixture at a pressure between 15 and 50 bar and at a temperature between 120° and 220° C. within a period of 5 to 20 minutes.

11. The process of claim 10 wherein the said mixture prior to hardening consists essentially of
    (a) between 30 and 40 parts by weight of finely divided calcined magnesite,
    (b) a woodfiller consisting predominantly of wood chips in an amount between 3 and 4 times the weight of the calcined magnesite,
    (c) between 4 and 6 parts by weight of inactive diatomaceous earth,
    (d) between 9 and 12 parts by weight of magnesium chloride in the form of an aqueous solution, and
    (e) sufficient additional water to bring the water content of the mixture to between 30 and 60 parts by weight.

* * * * *